United States Patent
Briggs et al.

(10) Patent No.: US 10,606,231 B2
(45) Date of Patent: Mar. 31, 2020

(54) COMPUTER-MEDIATED REALITY INCLUDING PHYSICAL DAMPING FEEDBACK

(71) Applicant: International Business Machines Corporation, Armonk, NY (US)

(72) Inventors: Benjamin D. Briggs, Waterford, NY (US); Lawrence A. Clevenger, Rhinebeck, NY (US); Leigh Anne H. Clevenger, Rhinebeck, NY (US); Christopher J. Penny, Saratoga Springs, NY (US); Michael Rizzolo, Albany, NY (US); Aldis Sipolins, New York, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 146 days.

(21) Appl. No.: 15/816,566

(22) Filed: Nov. 17, 2017

(65) Prior Publication Data

US 2019/0155236 A1 May 23, 2019

(51) Int. Cl.
*G05B 19/048* (2006.01)
*G05B 19/042* (2006.01)
*G06T 11/60* (2006.01)

(52) U.S. Cl.
CPC ........ *G05B 19/048* (2013.01); *G05B 19/042* (2013.01); *G05B 2219/39449* (2013.01); *G06T 11/60* (2013.01)

(58) Field of Classification Search
CPC ........ G05B 19/048; G05B 2219/39449; G06T 11/60
See application file for complete search history.

(56) References Cited

U.S. PATENT DOCUMENTS 5,032,307 A   7/1991  Carlson
5,702,630 A   12/1997 Sasaki et al.
(Continued)

FOREIGN PATENT DOCUMENTS

EP    2349366 B1    8/2013
JP    07250970 A    10/1995

OTHER PUBLICATIONS

Lu et al. "Silk Fibroin Electrogelation Mechanisms" Acta Biomaterialia, vol. 7, Issue 6, Jun. 2011, pp. 2394-2400.

*Primary Examiner* — Sisay Yacob
(74) *Attorney, Agent, or Firm* — Cantor Colburn LLP; Vazken Alexanian

(57) ABSTRACT

A computer-mediated physical damping feedback system includes a motion damping device, a voltage conversion controller, and a voltage generator controller. The motion damping device is worn by a participant present in a real-world environment, and is configured to vary a moveable flexibility of the participant in response to receiving an electrical voltage. The voltage conversion controller is in signal communication with a computer-mediated environment engine (CMEE) controller, and is configured to determine a voltage level of the electrical voltage based at least in part on the interaction between the participant and a computer-mediated environment. The voltage generator controller is in signal communication with the motion damping device and the voltage conversion controller. The voltage generator controller is configured to generate the electrical voltage at the voltage level that induces the stress applied by the motion damping device.

20 Claims, 12 Drawing Sheets

(56) References Cited

U.S. PATENT DOCUMENTS

| | | | |
|---|---|---|---|
| 5,721,566 A | 2/1998 | Rosenberg et al. | |
| 6,057,828 A | 5/2000 | Rosenberg et al. | |
| 6,104,158 A | 8/2000 | Jacobus et al. | |
| 8,501,172 B2 | 8/2013 | Kaplan et al. | |
| 9,342,151 B2 | 5/2016 | Gu | |
| 9,582,072 B2 | 2/2017 | Connor | |
| 2004/0229702 A1* | 11/2004 | Cooke | A63F 13/02 463/47 |
| 2007/0123997 A1* | 5/2007 | Herr | A61F 2/60 623/27 |
| 2014/0139454 A1* | 5/2014 | Mistry | G06F 3/041 345/173 |
| 2014/0342844 A1* | 11/2014 | Mooney | G06K 9/00342 473/266 |
| 2015/0040282 A1* | 2/2015 | Longinotti-Buitoni | A61B 5/6804 2/69 |
| 2016/0107309 A1* | 4/2016 | Walsh | A61H 3/00 248/550 |
| 2016/0259417 A1 | 9/2016 | Gu | |
| 2017/0290698 A1* | 10/2017 | Elias | A61F 5/37 |
| 2017/0312614 A1* | 11/2017 | Tran | H04W 4/027 |

\* cited by examiner

COMPUTER-MEDIATED REALITY INCLUDING PHYSICAL DAMPING FEEDBACK

BACKGROUND

Embodiments of the present invention relate to computer-generated environments, and more specifically, to computer-mediated reality technology.

Computer-mediated reality technology such as virtual reality, augmented reality, or other virtual representative environments for example, refers to the ability to digitally add information to, subtract information from, or otherwise manipulate one's perception of reality through the use of a wearable computer or hand-held device such as, for example, a smartphone. Virtual representative environments, for example, allow humans to interact with a computer via a computer-simulated environment. Augmented reality environments differ from virtual reality environments in that a real-world or "live" environment is "augmented" by computer-generated or extracted real-world sensory inputs such as sound, video, graphics or GPS data.

SUMMARY

Various non-limiting embodiments of the present invention provide a computer-mediated physical damping feedback system comprising a motion damping device, a voltage conversion controller, and a voltage generator controller. The motion damping device is worn by a participant present in a real-world environment, and is configured to vary a moveable flexibility of the participant in response to receiving an electrical voltage. The voltage conversion controller is in electronic communication with a computer-mediated environment engine (CMEE) controller, and is configured to determine a voltage level of the electrical voltage based at least in part on the interaction between the participant and a computer-mediated environment. The voltage generator controller is in electronic communication with the motion damping device and the voltage conversion controller. The voltage generator controller is configured to generate the electrical voltage at the voltage level that induces the stress applied by the motion damping device.

According to embodiments of the invention, the computer-mediated physical damping feedback system further comprises a computer-mediated environment engine (CMEE) controller in electronic communication with the motion damping device. The CMEE controller is configured to generate the computer-mediated environment including a computer-generated skeletal model and at least one virtual object.

According to embodiments of the invention, the motion damping device includes at least one stiffness control device that adjusts a stiffness of the motion damping device based at least in part on the electrical voltage so as to vary the moveable flexibility of the participant.

According to embodiments of the invention, the stiffness control device comprises an electro-responsive gel unit that contains an electro-responsive gel having a viscosity that varies based at least in part on the voltage level of the electrical voltage.

According to embodiments of the invention, at least one of the viscosity and a flowed amount of the electro-responsive gel decreases as the voltage level increases.

According to embodiments of the invention, the skeletal model reproduces a movement of the participant, and has at least one virtual interaction point located at a point that matches a real-world location of the at least one stiffness control device. The virtual interaction points are configured to indicate an interaction between the skeletal model and the at least one virtual object.

According to embodiments of the invention, the CMEE controller identifies the at least one virtual object in response to detecting an interaction between the at least one interaction point of the skeletal model and the at least one virtual object.

According to embodiments of the invention, the CMEE controller determines a resistance level corresponding to the interaction between the at least one interaction point of the skeletal model and the at least one virtual object.

According to embodiments of the invention, the resistance level is utilized to determine a corresponding voltage level that, when delivered to a stiffness control device, varies the stiffness applied to the user.

According to embodiments of the invention, the CMEE controller determines the voltage level that, when applied to the at least one electro-responsive gel unit, varies at least one of a viscosity of the gel and an amount of gel flowing through the electro-responsive gel unit to simulate the expected resistance.

According to embodiments of the invention, at least one first electro-responsive gel unit is located at a first area of the motion damping device receives a first voltage having a first voltage level, and at least one second electro-responsive gel unit is located at a different second area receives a second voltage having a different second voltage level. The first voltage level induces a first stress at the first location, and the second voltage level induces a second stress at the second location that is different from the first stress.

According to another non-limiting embodiment the present invention, a computer-implemented method is provided for controlling a computer-mediated physical damping feedback system. The computer-implemented method comprises detecting movement of a motion damping device, which is configured to vary a moveable flexibility of a participant in response to an electrical voltage. The method further comprises generating a computer-mediated environment including a computer-generated skeletal model and at least one virtual object. The method further comprises determining a voltage level of the electrical voltage based at least in part on the interaction between the skeletal model and the at least one virtual object, and generating the electrical voltage at the voltage level that induces the stress applied by the motion damping device.

Another non-limiting embodiment of the invention is directed to a computer program product for controlling a computer-mediated physical damping feedback system, the computer program product including a computer readable storage medium having program instructions embodied therewith. The program instructions are executable by a processor to cause the processor to perform a method. A non-limiting example of the method includes detecting movement of a motion damping device, which is configured to vary a moveable flexibility of a participant in response to an electrical voltage. The method further comprises generating a computer-mediated environment including a computer-generated skeletal model and at least one virtual object. The method further comprises determining a voltage level of the electrical voltage based at least in part on the interaction between the skeletal model and the at least one virtual object, and generating the electrical voltage at the voltage level that induces the stress applied by the motion damping device.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
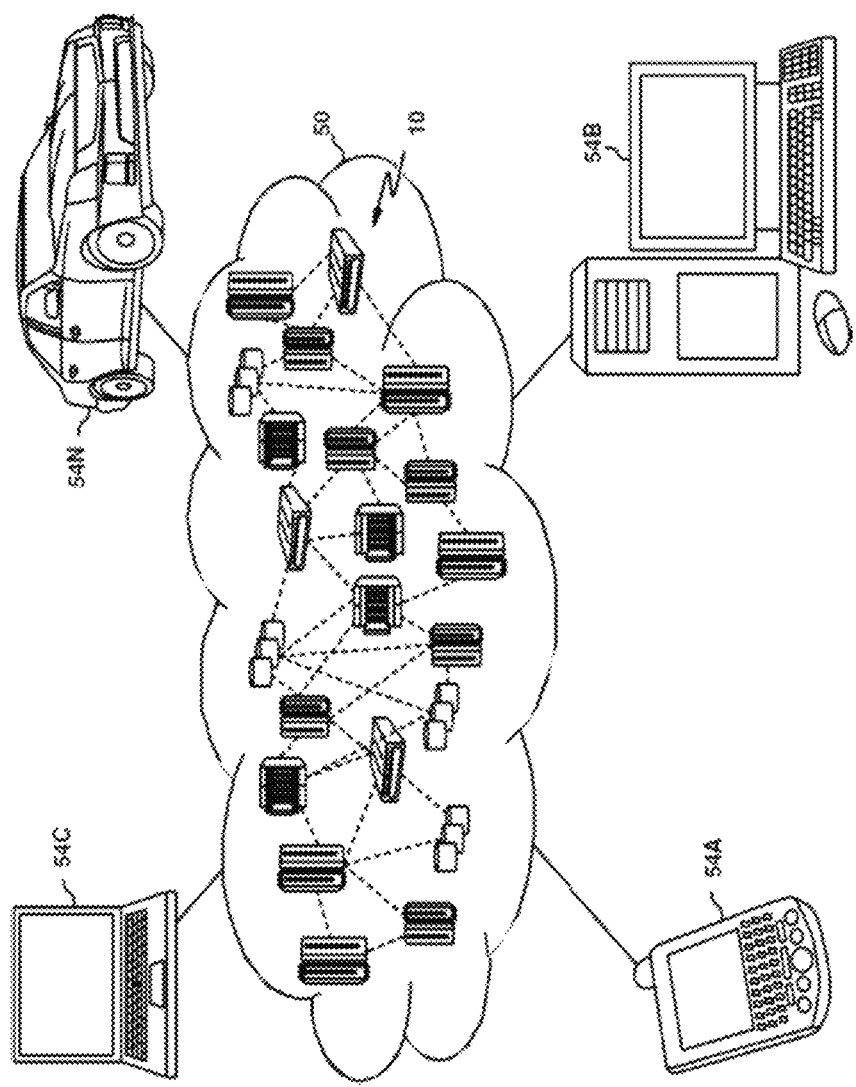
FIG. 1 depicts a cloud computing environment according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and present embodiments of the invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using embodiments of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood in advance that although a detailed description on cloud computing is provided, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can be employed on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Turning now to an overview of technologies that are more specifically relevant to aspects of the various embodiments of the invention, improvements in sensor technologies and image feedback have promoted substantial advancements in computer-mediated reality technology such as, for example, virtual reality, augmented reality, mixed reality, and holographic computing. Virtual reality (VR) is sometimes referred to as "immersive multimedia" or "computer-simulated reality", and aims to replicate an environment that simulates a physical presence in places in the real-world. VR technology typically involves the implementation of content-viewing hardware such as, for example, head-mounted displays (HMDs), VR imaging units, and VR cameras.

Augmented reality (AR) typically involves a live, direct or indirect view of a physical, real-world environment. However, elements of the real-world environment are augmented (e.g., added, removed, and/or supplemented) by computer-generated sensory input such as, for example, sound, video, graphics, web street-mapping data, and/or GPS data. AR aims to overlay computer-generated content on live images of the real-world.

Mixed reality (MR) is sometimes viewed as a division of AR technology, or as a "hybrid reality." MR typically involves the merging of real and virtual worlds to produce new environments and visualizations where physical and digital objects co-exist and interact in real time. MR can be viewed as an overlay of synthetic content on a live image of the real-world, which is anchored to and interacts with the real-world objects. For example, an example of MR could include a picture surgeons overlaying virtual ultrasound images on their patient while performing an operation. Accordingly, MR can allow for the interaction between synthetic content and real-world content in real time.

Holographic computing, sometimes referred to as computer generated holography (CGH) refers to a method of digitally generating holographic interference patterns. A holographic image can be generated, e.g. by digitally computing a holographic interference pattern, and reproducing the holographic image on a visual medium such as, for example, a holographic three-dimensional (3D) display, sometimes referred to as holographic optical system. These holographic 3D displays operate on the basis of interference of coherent light, which can reproduce the holographic as life-like images.

However, the aforementioned various computer-media technologies each suffer from an inability to completely immerse the human or participant in the computer-generated environment.

Turning now to an overview of the aspects of the invention, one or more embodiments of the invention address the above-described shortcomings of the prior art by providing a computer-mediated physical damping feedback system that includes a motion damping device that is worn by a user participating in a computer-mediated environment. The motion damping device includes at least one stiffness control device that adjusts a stiffness of the motion damping device in response to receiving an applied electrical voltage. The motion damping device is in electronic communication with a controller that generates a virtual skeleton (e.g., or avatar) that models the movement of the motion damping device worn by the user. The virtual skeleton has interaction points that are mapped to locations of the stiffness control devices installed on the motion damping device. The controller detects a virtual interaction between the virtual skeleton and the computer-mediated environment, and determines a predicted resistance in movement of which the user would expect to experience in a similar real-world environment.

The computer-mediated physical damping feedback system further includes a voltage conversion controller that determines the expected resistance determined by the VR engine controller, and generates a voltage for achieving the expected resistance. The voltage is then transmitted to one or more stiffness control devices such that stiffness or rigidity of the motion damping device is changed and the participant experiences increased resistant which simulates the resistance that participant would expect to realize when performing the same movement or action in the real-world.

As previously mentioned, conventional computer-mediated experiences such as VR, for example, are limited to a visual experience. The above-described aspects of the invention address the shortcomings of the prior art by providing physical damping feedback through the motion damping device, which simulate anatomical scenarios and enhances the immersion experience. In this manner, one or more embodiments of the invention are capable of expanding the physical anatomical experience of a user participating in a computer-mediated environment. Not only does a participant experience a more immersive and expanded anatomical experience, the ability to physically simulate real-world resistances can be utilized to mirror resistive muscle training, physical therapy, and rehabilitation.

Turning now to a more detailed description of aspects of the present invention, FIG. 1 depicts a cloud computing environment 50 according to embodiments of the invention.

As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
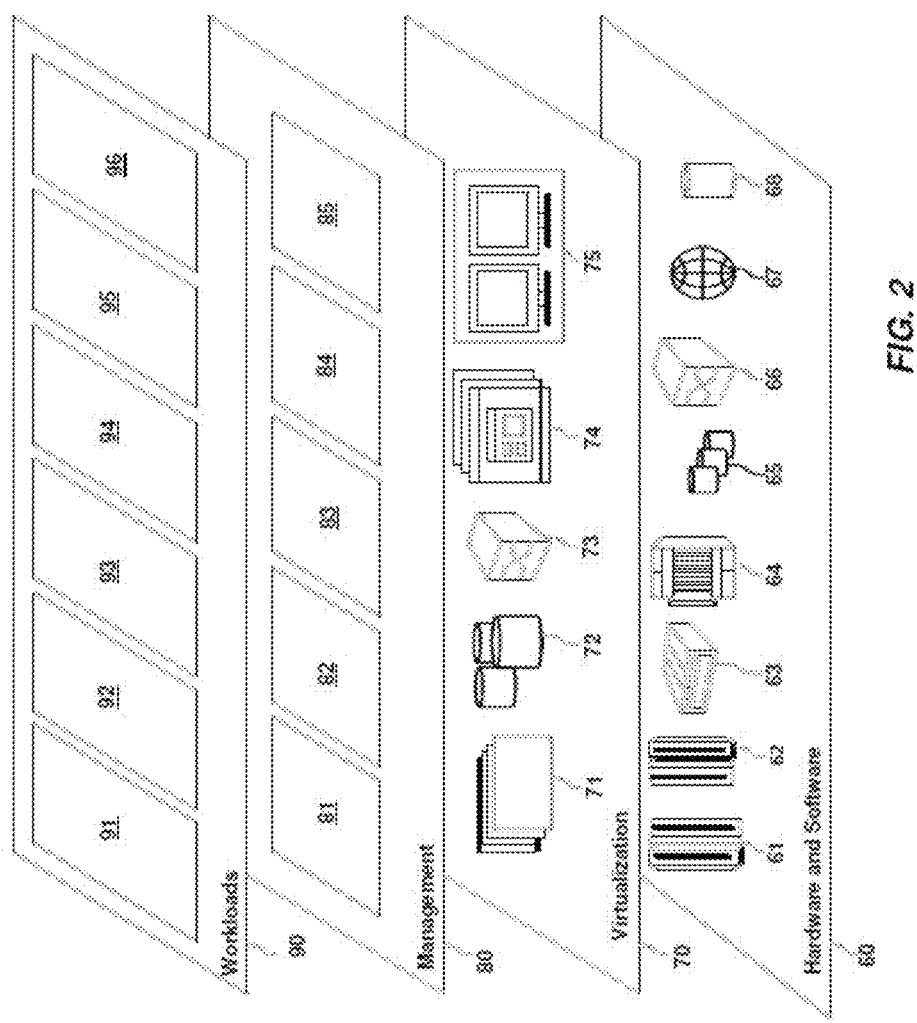
FIG. 2 depicts abstraction model layers according to embodiments of the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and input data analysis 96.

Figure 3:
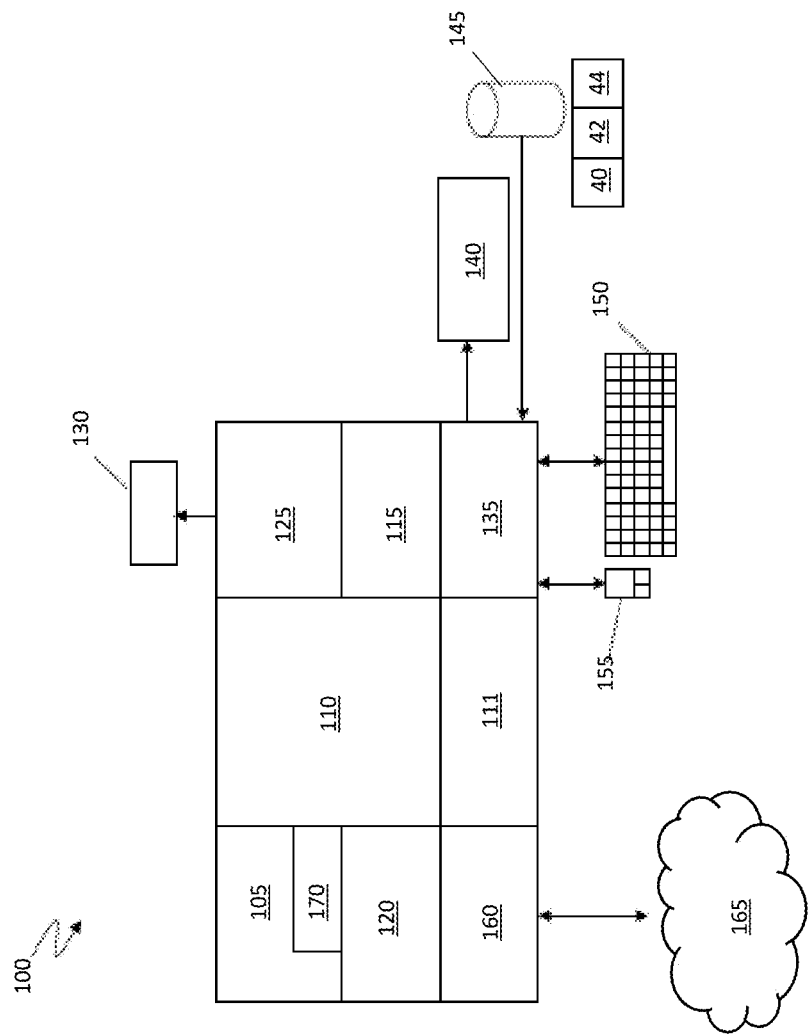
FIG. 3 depicts a communication apparatus according to embodiments of the present invention.

With reference to FIG. 3, a computing system 100 capable of capable of fusing together raster data and vector data formats is illustrated according to one or more embodiments of the invention. The computing system 100 can include a computer, such as a server, a laptop computer, a tablet computer, a phone, and the like.

The computing system 100 includes, among other components, a processor 105, memory 110 coupled to a memory controller 115, and one or more input devices 145 and/or output devices 140, such as peripheral or control devices, which are communicatively coupled via a local I/O controller 135. These devices 140 and 145 can include, for example, battery sensors, position sensors (altimeter 40, accelerometer 42, GPS 44), indicator/identification lights and the like. Input devices such as a conventional keyboard 150 and mouse 155 can be coupled to the I/O controller 135. The I/O controller 135 can be, for example, one or more buses or other wired or wireless connections, as are known in the art. The I/O controller 135 can have additional elements, which are omitted for simplicity, such as controllers, buffers (caches), drivers, repeaters, and receivers, to enable communications.

The I/O devices 140, 145 can further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 can be a custom made or commercially available processor, a central processing unit (CPU), an auxiliary processor among several processors associated with the computing system 100, a semiconductor based microprocessor (in the form of a microchip or chip set), a macroprocessor, or other device for executing instructions. The processor 105 includes a cache 170, which can include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 can be organized as a hierarchy of more cache levels (L1, L9, and so on.).

The memory 110 can include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 can incorporate electronic, magnetic, optical, or other types of storage media. Note that the memory 110 can have a distributed architecture, where various components are situated remote from one another but can be accessed by the processor 105.

The instructions in memory 110 can include one or more separate programs, each of which comprises an ordered listing of executable instructions for implementing logical functions. In the example of FIG. 3, the instructions in the memory 110 include a suitable operating system (O/S) 111. The O/S 111 essentially can control the execution of other computer programs and provides scheduling, input-output control, file and data management, memory management, and communication control and related services.

Additional data, including, for example, instructions for the processor 105 or other retrievable information, can be stored in storage, which can be a storage device such as a hard disk drive or solid state drive. The stored instructions in memory 110 or in storage can include those enabling the processor to execute one or more aspects of the systems and methods described herein.

The computing system 100 can further include a display controller 125 coupled to a user interface or display 130. In some embodiments, the display 130 can be an LCD screen. In other embodiments, the display 130 can include a plurality of LED status lights. In some embodiments, the computing system 100 can further include a network interface 160 for coupling to a network 165. The network 165 can be an IP-based network for communication between the computing system 100 and an external server, client and the like via a broadband connection. In an embodiment, the network 165 can be a satellite network. The network 165 transmits and receives data between the computing system 100 and external systems. In some embodiments, the network 165 can be a managed IP network administered by a service provider. The network 165 can be implemented in a wireless fashion, for example, using wireless protocols and technologies, such as WiFi, WiMax, satellite, or any other. The network 165 can also be a packet-switched network such as a local area network, wide area network, metropolitan area network, the Internet, or other similar type of network environment. The network 165 can be a fixed wireless network, a wireless local area network (LAN), a wireless wide area network (WAN) a personal area network (PAN), a virtual private network (VPN), intranet or other suitable network system and can include equipment for receiving and transmitting signals.

Figure 4:
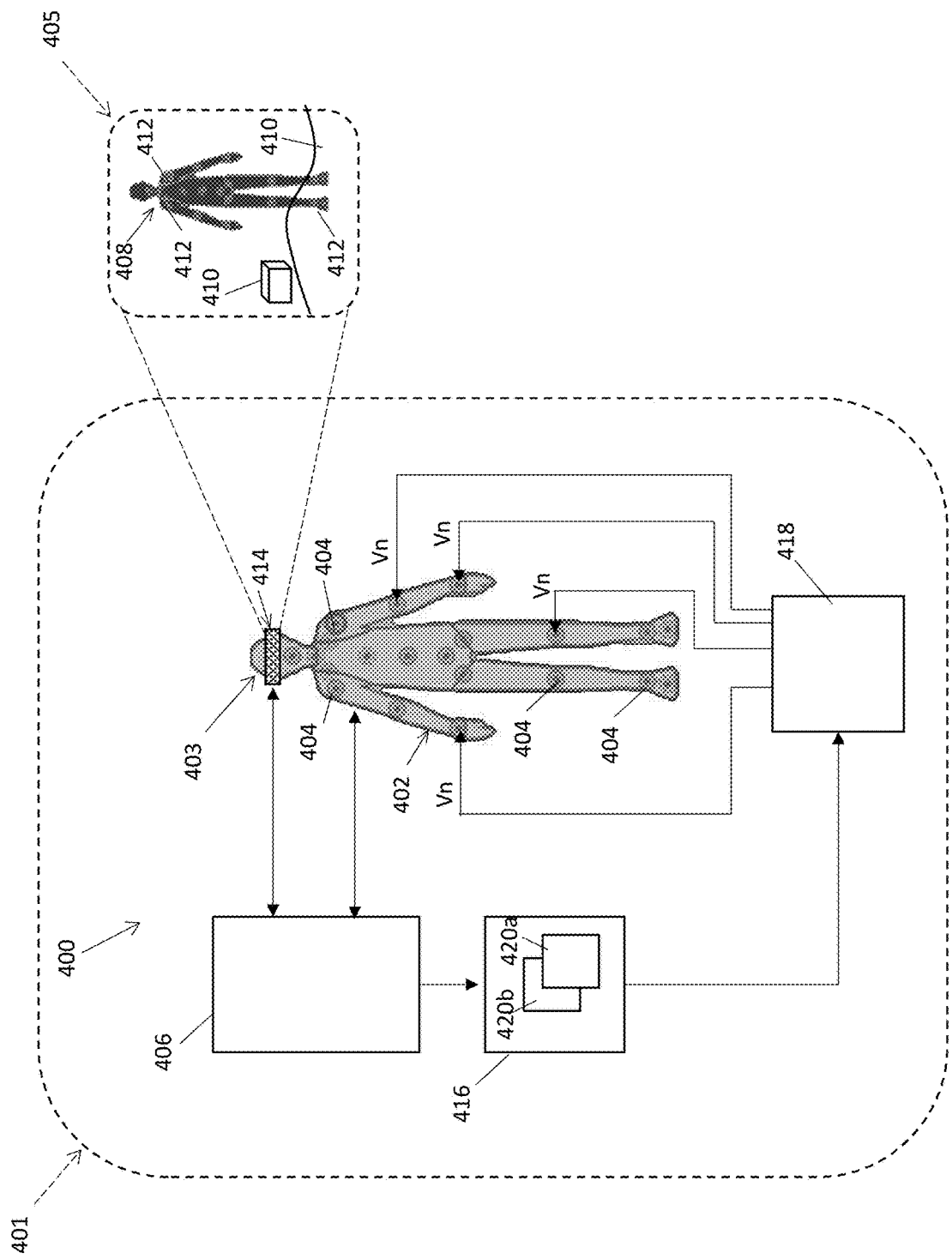
FIG. 4 depicts a computer-mediated physical damping feedback system according to embodiments of the invention.

Turning now to FIG. 4, a computer-mediated physical damping feedback system 400 is illustrated according to embodiments of the invention. The computer-mediated physical damping feedback system 400 includes a motion damping device 402 in electronic communication with a computer-mediated environment engine (CMEE) controller 406. The motion damping device 402 is configured to be worn by a participant 403 present in the real-world 401 or "live" environment 401. The motion damping device 402 can be constructed as various devices or articles including, but not limited to, a glove, a jacket, socks, a mask, a full-body suit, or combinations thereof.

The motion damping device 402 includes at least one stiffness control device 404 that adjusts a stiffness of one or more areas of the motion damping device 402 in response to receiving an applied electrical voltage. In one or more embodiments of the invention, the stiffness control device 404 is constructed as an electro-responsive gel unit, which contains an electro-responsive fluid or gel having a viscosity that varies in response to the applied voltage. The electro-responsive gel unit is described in greater detail below.

The CMEE controller 406 is in electronic communication with the motion damping device 402 and is configured to generate a computer-mediated environment 405. The computer-mediated environment 405 includes a computer-generated skeletal model 408 (e.g. an avatar 408) and at least one virtual object 410. Although the computer-mediated environment 405 is illustrated as a VR environment, the physical damping feedback system 400 can operate as described herein using other types of computer-mediated environments including, but not limited to, AR environments, MR environments, and holographic-computing environments.

The CMEE controller 406 is also in electronic communication with a CMEE display device 414, which is configured to display the computer-mediated environment 405. The CMEE display device 414 includes, but is not limited to, a heads-up-display (HUD) virtual reality display device, an augmented reality display device, a holographic display device, a smart phone/tablet computer, or any device capable of displaying a computer-mediated environment generated by the CMEE controller 406. In this manner, the participant 403 present in the real-world 401 can realize or be immersed in the computer-mediated environment 405 generated by the CMEE 406.

The skeletal model 408 is a visual representation of the motion damping device 402 worn by the user, and is configured to model or mirror movements performed by the participant 403 in the real-world. In one or more embodiments of the invention, the skeletal model 408 is computer generated avatar. The skeletal model 408 has at least one virtual interaction point 412 that matches a location of a corresponding stiffness control device 404. The virtual interaction point 412 can indicate an interaction between the skeletal model 408 and one or more virtual object 410. In this manner, the CMEE controller 406 can monitor the virtual interaction points 412 and detect an interaction between the skeletal model 408 and the computer-mediated environment 405.

The CMEE controller 406 is also capable of identifying one or more virtual objects 410 present in the computer-mediated environment 405. In one or more embodiments of the invention, the CMEE controller 406 can detect an interaction between one or more interaction points 412 and the virtual object 410, and can determine an equivalent real-world object corresponding to the interacted virtual object 410. For instance, the CMEE controller 406 can determine that the skeletal model 408 (e.g., avatar) is walking in sand compared to walking on cement in response to detecting that one or more interaction points 412 are contacting computer-generated sand in the computer-mediated environment 405.

The computer-mediated physical damping feedback system 400 further includes a voltage conversion controller 416 and a voltage generator controller 418. The voltage conversion controller 416 is in electronic communication with the CMEE controller 406. The CMEE controller 406 outputs an object interaction electronic communication to the voltage conversion controller 416 indicating the identified object. Based at least in part on the identified object indicated by the CMEE controller 406, the voltage conversion controller 416 that communicates a resistance level, which is then utilized to determine a corresponding voltage level that varies a stiffness applied by one or more stiffness control device 404. In one example, the voltage conversion controller 416 predicts an expected resistance in movement the participant 403 would experience when interacting with the equivalent real-world object.

In one or more embodiments of the invention, the voltage conversion controller 416 utilizes a resistance look-up table (LUT) 420a to determine the expected resistance that corresponds to the equivalent real-world object, i.e., the real-world object that equates to the virtual object 410 interacting with the skeletal model 408. For example, the resistance LUT 420a cross-references a plurality of different stored virtual objects identifiers (IDs), corresponding to different virtual objects 410, with a resistance value corresponding to predicted resistance the participant 403 would expect to realize when interacting with the equivalent real-world object. The predicted resistance and the corresponding resistance value can be determined via off-line testing and then stored in the memory of the voltage conversion controller 416. In this manner, the voltage conversion controller 416 can cross-reference a given virtual object ID, corresponding with the interacted virtual object 410, with the resistance value to determine the predicted resistance.

Once the predicted resistance is determined, the voltage conversion controller 416 further determine a voltage level (Vn) that, when applied to one or more stiffness control devices 404, adjusts a stiffness of one or more areas of the motion damping device 402 to achieve the resistance in motion expected by the participant 403. Similar to the resistance LUT 420a, the voltage conversion controller 416 can utilize a voltage LUT 420b to determine the voltage level necessary to achieve the stiffness expected by the participant 403. For example, the voltage LUT cross-references a plurality of different resistance values, corresponding to a given virtual object ID, with a respective voltage value. The different resistance values can further include individual resistance values associated with each stiffness control unit 404. In one or more embodiments of the invention, a first stiffness control unit 404 is assigned a first voltage value corresponding to a given virtual object, and a different stiffness control unit 404 is assigned a different second voltage value corresponding to the given virtual object. When picking up a heavy object in the real-world, for example, a person's hand can experience greater stiffness or a more limited range of motion than the person's upper arm or shoulder. Therefore, voltage LUT 420b can map the virtual object ID to different voltage levels assigned to stiffness control devices 404 located in the hand, upper arm and/or shoulder. The voltage levels corresponding to actual stiffness experienced when interacting with real-world objects can be determined via off-line testing and then stored in the memory of the voltage conversion controller 416.

The voltage generator controller 418 is in electronic communication with the voltage conversion controller 416 and the motion damping device 418. The voltage generator controller 418 is configured to output at least one voltage having the voltage level (Vn) that controls the stiffness applied to the motion damping device 402 by one or more of the stiffness control devices 404. In this manner, the participant 403 realizes a simulated resistance in movement that matches or substantially matches the interaction between the skeletal model 408 and one or more virtual objects 410 present in the computer-mediated environment 405.

Figure 5:
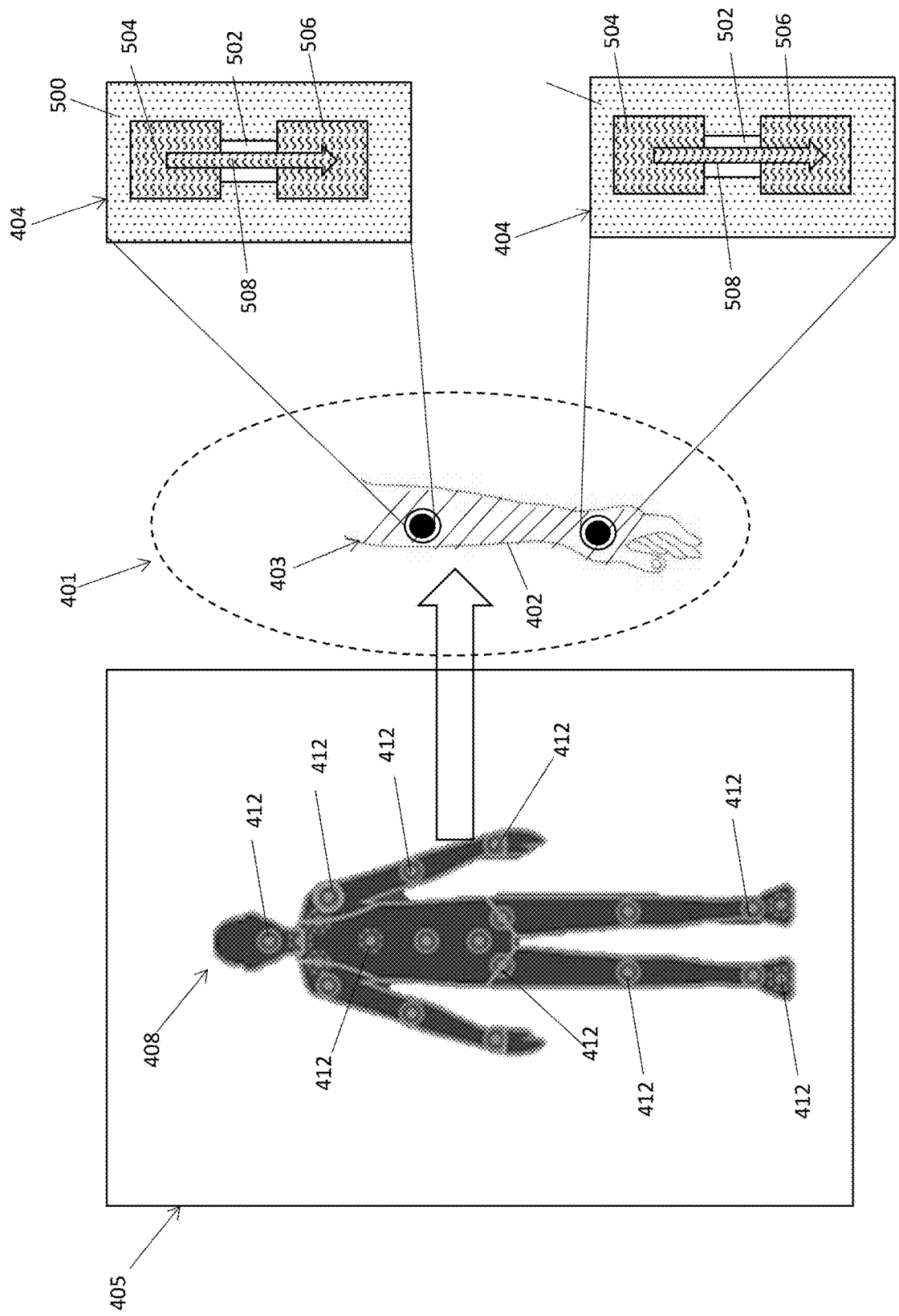
FIG. 5 depicts a mapping between virtual interaction points of an avatar and electro-response gel units installed on a motion damping device according to embodiments of the present invention.

Turning to FIG. 5, stiffness control devices 404 constructed as electro-responsive gel units 404 are illustrated according to one or more embodiments of the invention. The electro-responsive gel unit 404 includes a substrate 500 that supports a control junction 502 interposed between a first junction 504 and a second junction 506. The electro-responsive gel unit 404 further includes an electro-responsive gel 508 that flows from the first junction 504 to the second junction 506 in response to an electrical voltage applied to the control junction 502. The flow rate of the electro-responsive gel 508 flowing between the first junction 504 and the second junction 506 is based at least in part on the voltage level applied to the control junction 502. In one or more embodiments of the invention, the viscosity and/or our amount of the electro-responsive gel 508 decreases as the voltage level increases. In addition, the viscosity of the gel 508 can be reversed (i.e., from more viscous to less viscous, and vice versa) in response to reversing the polarity of the applied voltage (i.e., from positive voltage to negative voltage, and vice versa). Various types of electro-responsive gels can 508 can be employed including, but not limited to, a silk-fibroin gelation material, also referred to as an "e-gel". Other field-driven mechanism or electro-responsive solutions can also be used including, but not limited to, surfactant-based electrorheological fluids.

Figure 6:
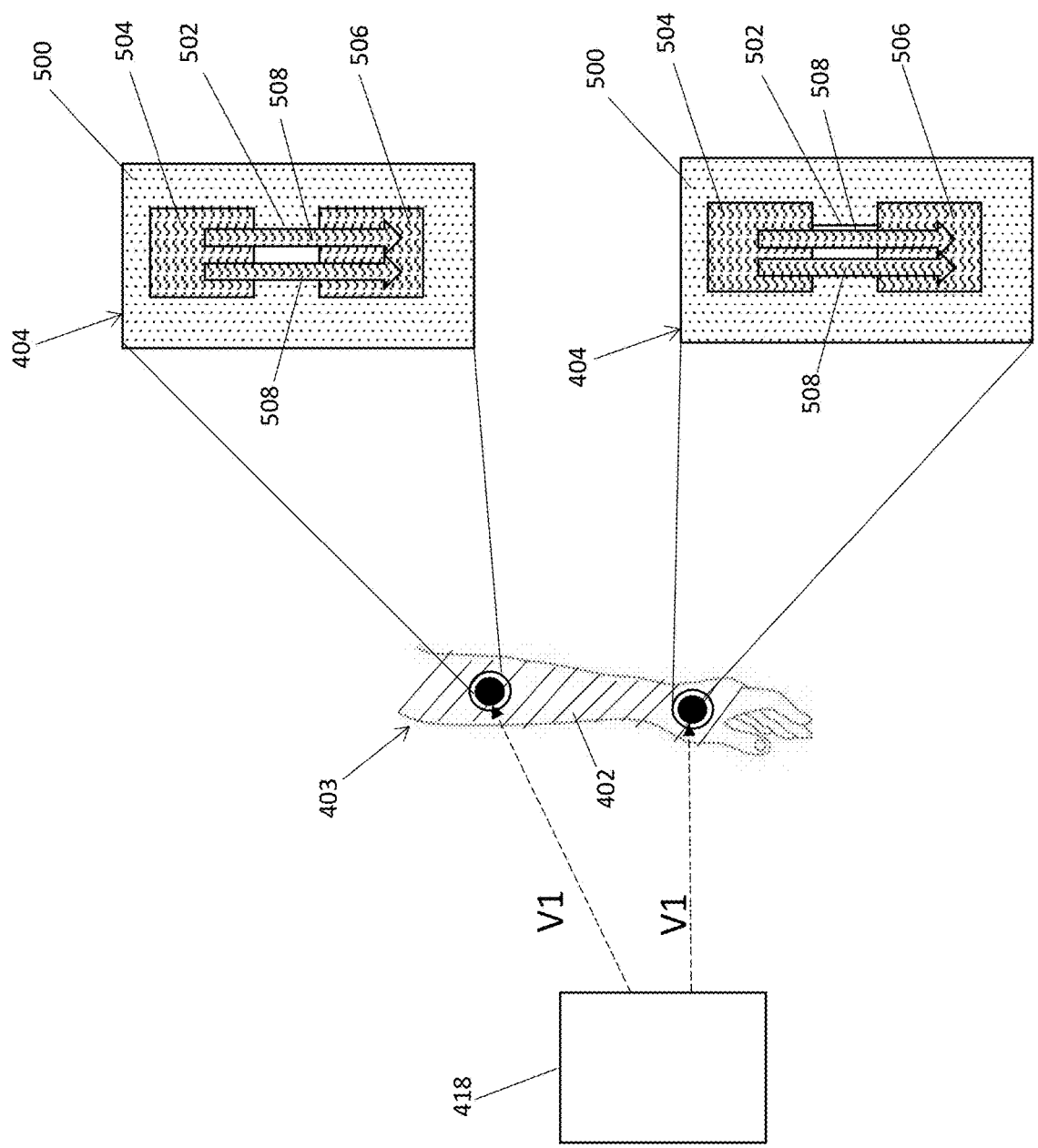
FIG. 6 depicts the operation of electro-response gel units in response to first voltage levels according to embodiments of the invention.
Figure 7:
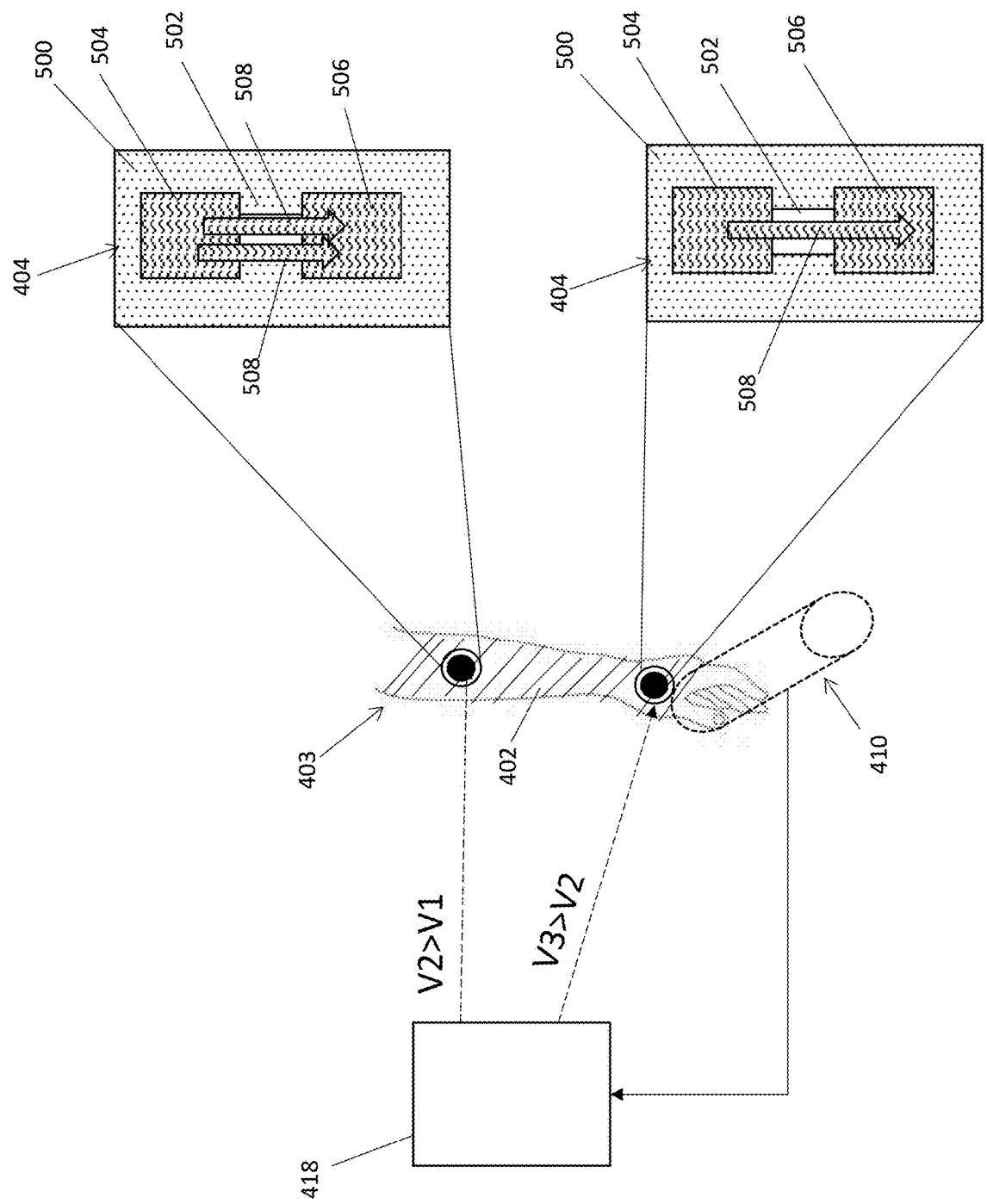
FIG. 7 depicts the operation of the electro-response gel units in response to second voltage levels mapped to a first type of virtual object according to embodiments of the invention.
Figure 8:
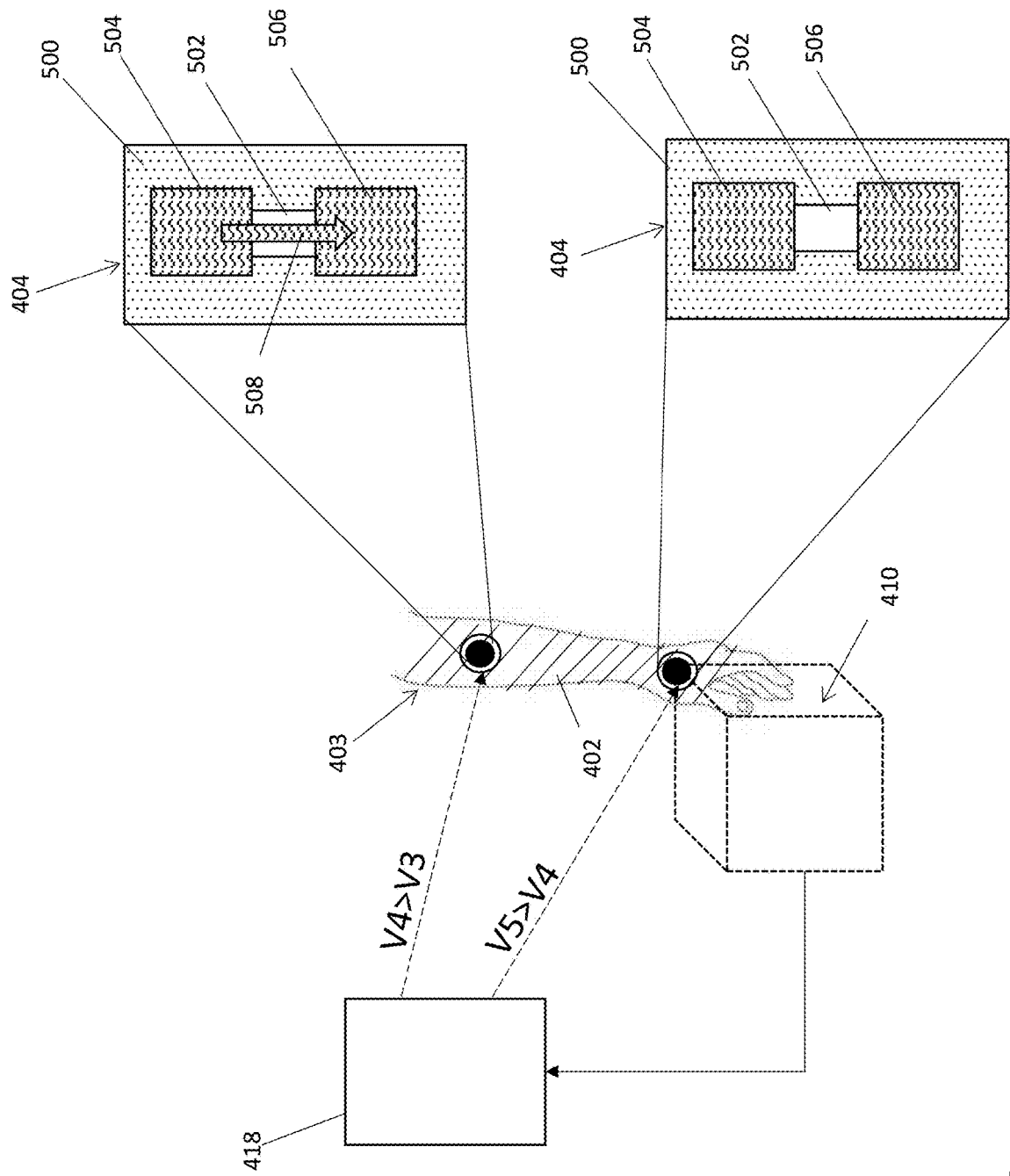
FIG. 8 depicts the operation of the electro-response gel units in response to third voltage levels mapped to a second type of virtual object according to embodiments of the invention.

An exemplary operation of the electro-responsive gel units 404 is depicted in FIGS. 6-8. Referring first to FIG. 6, the electro-responsive gel units 404 are shown operating in a first state. In this example, the first state can be viewed as a normal state during which the participant 403 is not interacting with any virtual objects present in the computer-mediated environment. Accordingly, the voltage generator controller 418 outputs voltages having a first voltage (V1) to the electro-responsive gel units 404. The first voltage (V1) invokes a high-viscous state of the electro-responsive gel 508 such that gel 508 freely flows from the first junction 504 and the second junction 506. As a result, a minimum amount of stiffness is exerted upon the motion damping device 402 such that the participant 403 realizes a maximum amount of flexibility and a minimum restriction to movement.

Referring now to FIG. 7, the electro-responsive gel units 404 are shown operating in a second state. The second state can be invoked when the participant 403 interacts with a virtual object 410 present in the computer-mediated environment. In response to interaction, the voltage generator controller 418 obtains information identifying the virtual object 410, and determines one or more voltage levels that, when applied to the electro-responsive gel units 404, will simulate a stiffness that the participant 403 would expect if performing the same interaction with an equivalent real-world object.

Once the voltage levels are determined, the voltage generator controller 418 outputs voltages having different voltage levels compared to the first voltage levels (V1) generated during the normal state described above. For example, a second voltage level (V2) greater than the first voltage level (V1) is applied to an electro-responsive gel units 404 located at the upper arm area of the motion damping device 402, while a third voltage level (V3) greater than the second voltage level (V2) is applied to an electro-responsive gel units 404 located at the hand or wrist area of the motion damping device 402. The second voltage (V2) decreases the viscosity of the electro-responsive gel 508 flowing through the electro-responsive gel units 404 located at the upper arm area.

Similarly, the third voltage (V3) further decreases the viscosity of the gel 508 flowing through the electro-responsive gel units 404 located at the hand or wrist area. The changes in viscosity and the delivered amount of gel 508 are represented by the changes in the illustration of the flow arrows. For example, the shorter flowrate arrows indicate a decrease in viscosity, while a reduction in the number of flowrate arrows indicates a reduced amount of delivered gel 508. As a result, the flexibility of the motion damping device 402 is decreased such the participant 403 realizes a greater restriction to their movements. In this manner, the participant 403 is made to feel as if that they are interacting with the real-world equivalent object.

Turning now to FIG. 8, the electro-responsive gel units 404 are shown operating in a third state. The third state can be invoked when the participant 403 interacts with a larger and/or heavier virtual object 410. In this scenario, the voltage generator controller 418 obtains information identifying the larger and/or heavier virtual object 410, and determines new voltage levels that, when applied to the electro-responsive gel units 404, will simulate a stiffness that the participant 403 would expect if performing the same interaction with the equivalent real-world object represented by the larger and/or heavier virtual object 410.

Once the voltage levels are determined, the voltage generator controller 418 outputs voltages having the corresponding voltage levels for simulating the stiffness that would be expect when interacting with the larger and/or heaver real world object. For example, a fourth voltage level (V4) greater than the third voltage level (V3) is applied to the electro-responsive gel units 404 located at the upper arm area of the motion damping device 402, while a fifth voltage level (V5) greater than the fourth voltage level (V4) is applied to the electro-responsive gel units 404 located at the hand or wrist area of the motion damping device 402. Because the virtual object 410 is larger and/or heavier, the fourth voltage (V4) further decreases the viscosity and/or amount of the electro-responsive gel 508 flowing through the electro-responsive gel units 404 located at the upper arm area. The fifth voltage (V5), in this example, decreases the viscosity of the gel 508 located at the hand/wrist area to a state where it is prevented, or substantially inhibited, from flowing from the first junction 504 (as indicated by the omission of the flowrate arrow). As a result, the flexibility of the motion damping device 402 is further decreased such that the participant or user 403 realizes an even greater restriction to their movements compared to the scenarios described in FIGS. 6 and 7. In this manner, the participant 403 is made to feel as if that they are interacting with the real-world equivalent of the larger and/or heavier virtual object 410.

Figure 9:
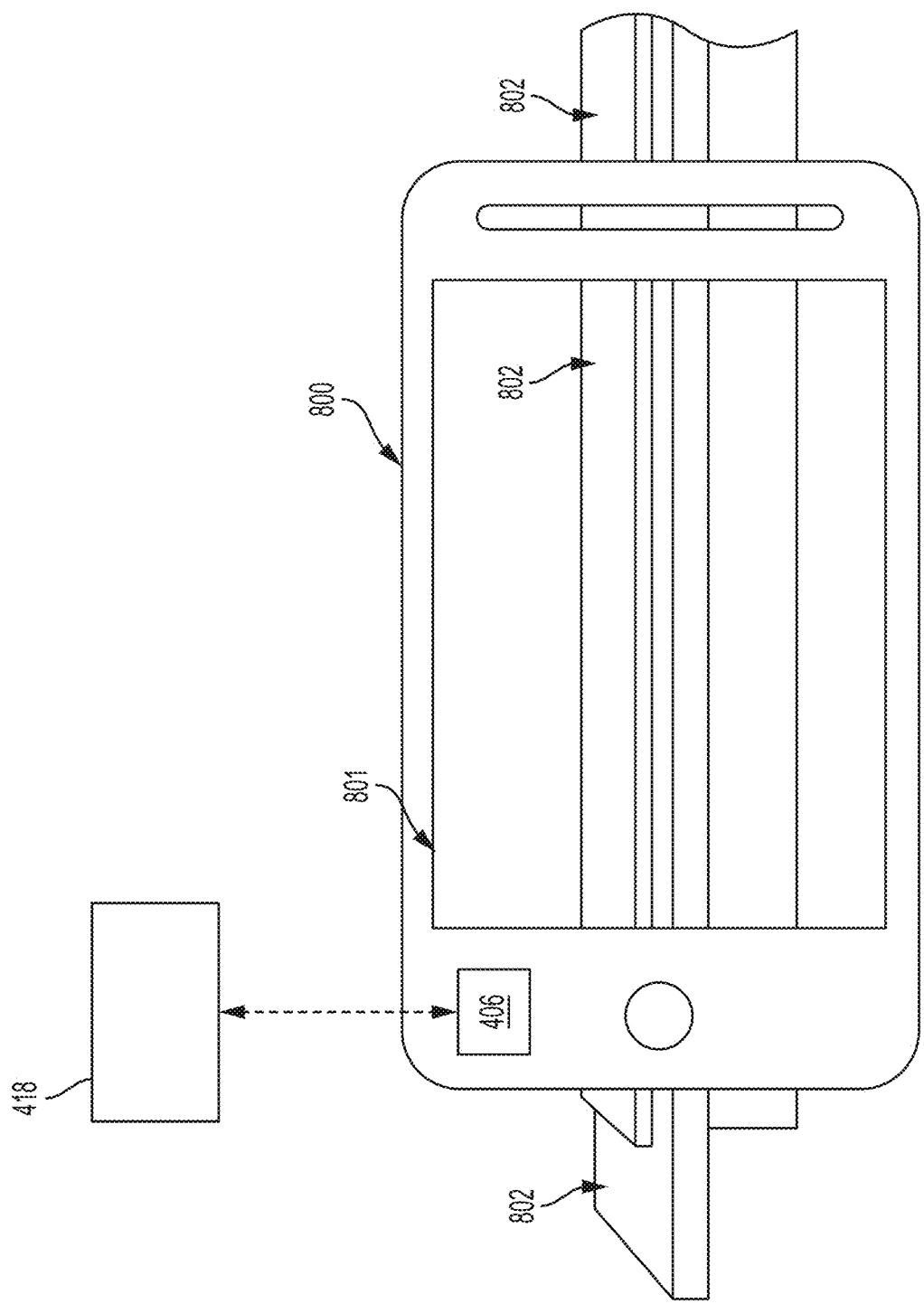
FIG. 9 depicts a computer-mediated physical damping feedback system according to another non-limiting embodiment of the invention.
Figure 10:
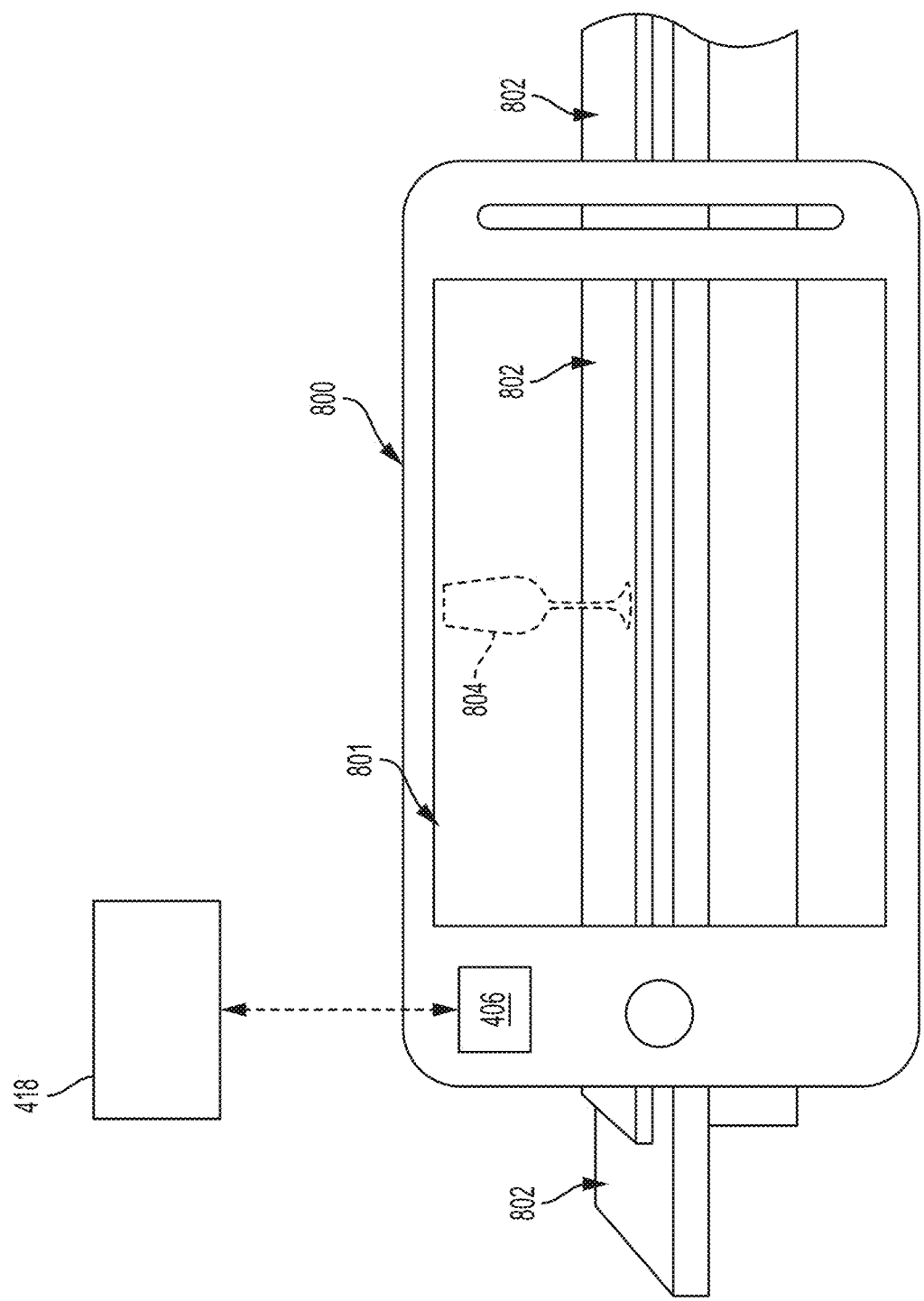
FIG. 10 depicts a computer-mediated physical damping feedback system of FIG. 9 while generating an augmented object on a display screen of a mobile CMEE display device.
Figure 11:
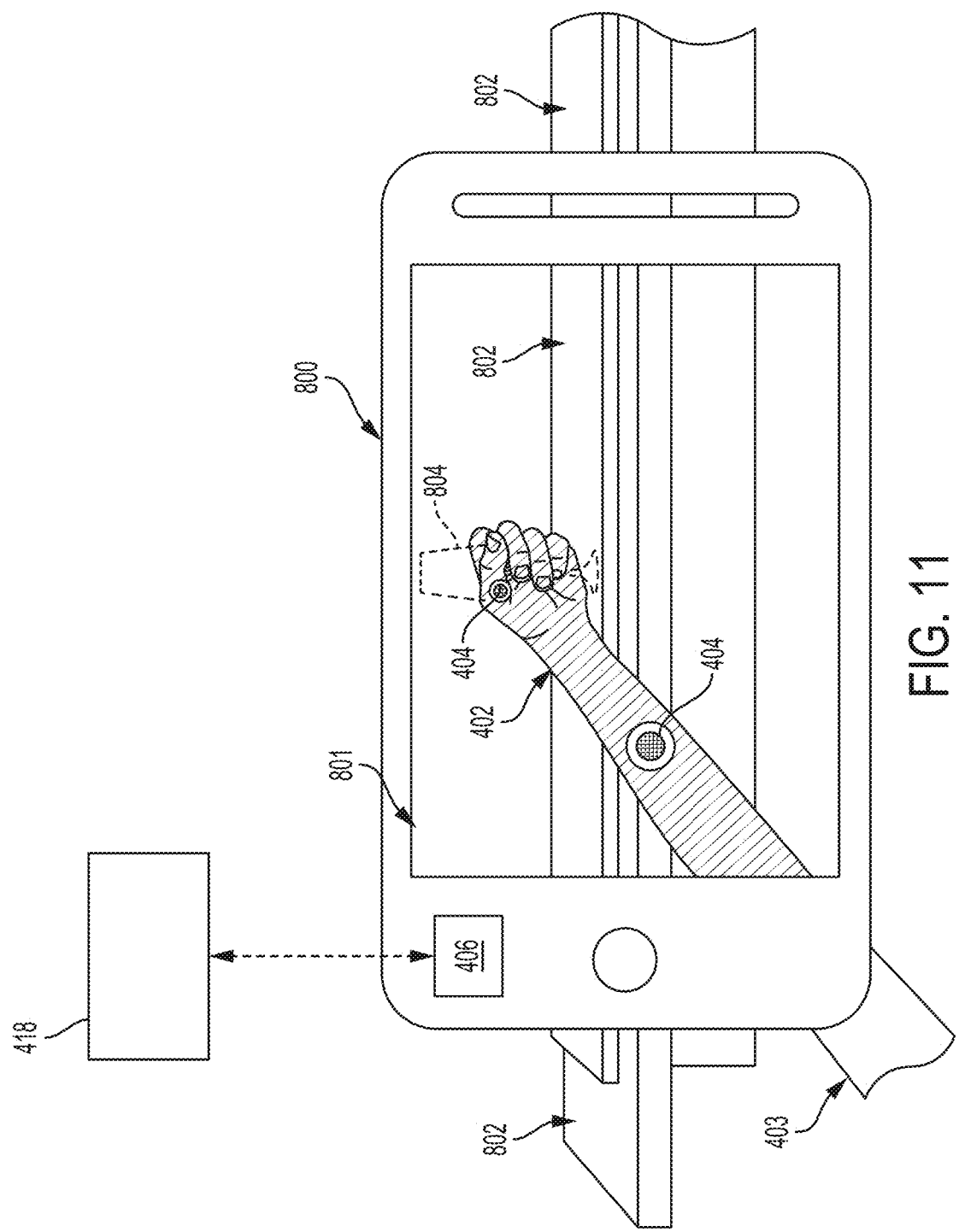
FIG. 11 depicts the computer-mediated physical damping feedback system of FIG. 10 including a motion damping device interacting with the augmented object.

Turning now to FIGS. 9-11, a computer-mediated physical damping feedback system is illustrated according to another non-limiting embodiment of the invention. Referring first to FIG. 9, the computer-mediated physical damping feedback system includes a voltage generator controller 418 in signal communication with a mobile CMEE display device 800. The voltage generator controller 418 operates as previously described above. The mobile CMEE display device 800 includes a CMEE controller 406 and a display 801. The CMEE controller 406 operates as described in detail above. The CMEE display device 800 further includes an image sensor or camera (not shown) capable of capturing an image of the surrounding real-world environment which includes one or more real objects 802 (i.e., a physical object present in the real-world environment), and displaying the real-world environment on the display 801 as it currently appears to a user in real-time. In this example, the real-world environment includes a physical dining surface 802 (e.g., a table 802).

Turning to FIG. 10, the mobile CMEE display device 800 is illustrated augmenting the real-world environment by generating an augmented object 804, and displaying the augmented object 804 along with the real-world environment. The augmented object 804 can be generated by the CMEE controller 406, which in turn displays the augmented object 804 simultaneously with the real-world environment. In this example, the augmented object 804 is a digitally augmented glass 804 which is displayed as being located on the surface of the physical table 802.

Turning now to FIG. 11, a user 403 wearing a motion damping device 402 in the real-world environment is shown interacting with the augmented glass 804 displayed by the mobile CMEE device 800. As described above, the CMEE controller 406 is aware of the locations of the stiffness control devices 404 installed on the motion damping device 402. As the user 403 interacts with the augmented object 804, the CMEE controller 406 outputs a signal to the voltage generator controller 418 indicating which stiffness control devices 404 are interacting with the augmented object 804. Accordingly, the voltage generator controller 418 determines the stiffness levels associated with the interaction, generates the voltage levels for achieving the stiffness levels, and outputs voltage signals for applying the voltage levels to the stiffness control devices 404. In this manner, the user 403 realizes a stiffness that would be expected when performing the same action on an equivalent physical object (e.g., a physical glass).

Figure 12:
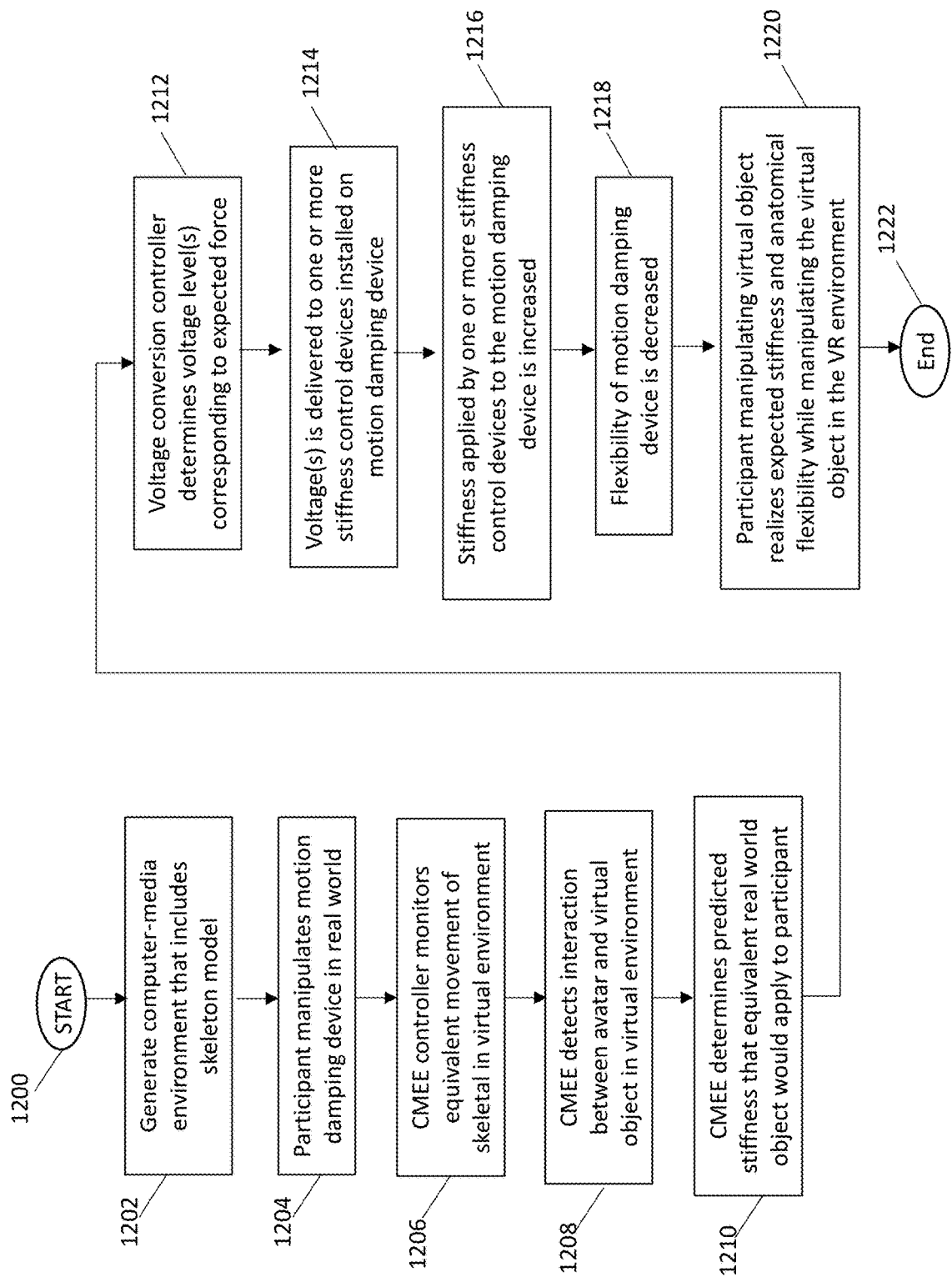
FIG. 12 depicts a flow diagram illustrating a method of controlling a computer-mediated physical damping feedback system according to embodiments of the invention.

Referring to FIG. 12, a flow diagram illustrates a method of controlling a computer-mediated physical damping feedback system according to one or more embodiments of the invention. The method begins at operation 1200, and a computer-media environment is generated at operation 1202. The computer-mediated environment can be generated as a VR environment or AR environment, for example. The computer-mediated environment can include a one or more virtual objects and a computer-generated skeletal model (e.g. an avatar) capable of interacting with the virtual objects. At operation 1204, a user or participant of the physical damping feedback system manipulates a motion damping device in a real-world environment, which in turn induces the same motion of the skeletal model in the computer-mediated environment. In an example scenario, the motion damping device is a body suit or glove worn by the participant.

Turning to operation 1206, the movement of the skeletal model is monitored by a CMEE controller for example. At operation 1208, an interaction between the skeletal model and a virtual object is detected. In one or more embodiments, the detected interaction includes identify the real-world equivalent object of the interacted virtual object. At operation 1210, a predicted stiffness is determined. The predicted stiffness is determined as a stiffness that the equivalent real-world object would be expected to apply in a similar real-world interaction with the participant. At operation 1212, one or more voltage levels corresponding to the predicted stiffness are determined, and voltages having the determined voltage levels are applied to one or more stiffness control devices for producing the predicted stiffness at operation 1214. At operation 1216, the stiffness applied by the stiffness control devices to the motion damping device is increased. In this manner, the flexibility of the motion damping device is decreased at operation 1218 such that the participant manipulating virtual object realizes the expected stiffness and anatomical flexibility while manipulating the virtual object in the VR environment at operation 1220. The method ends at operation 1222.

One or more embodiments of the present invention can be a system, a method, and/or a computer program product at any possible technical detail level of integration. The computer program product can include a computer readable storage medium (or media) having computer readable program instructions thereon for causing a processor to carry out aspects of the various embodiments of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the various embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instruction by utilizing state information of the computer readable program instructions to personalize the electronic circuitry, in order to perform aspects of the various embodiments of the present invention.

Aspects of the various embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-mediated physical damping feedback system comprising:
   a motion damping device configured to be worn by a participant present in a real-world environment, the motion damping device configured to vary a moveable flexibility of the participant in response to receiving an electrical voltage;
   a voltage conversion controller configured to determine a voltage level of the electrical voltage based at least in part on the interaction between the participant and a computer-mediated environment; and
   a voltage generator controller in electronic communication with the motion damping device and the voltage conversion controller, the voltage generator controller configured to generate the electrical voltage at the voltage level that induces the stress applied by the motion damping device.

2. The computer-mediated physical damping feedback system of claim 1, further comprising a computer-mediated environment engine (CMEE) controller in electronic communication with the motion damping device, the CMEE controller configured to generate the computer-mediated environment including a computer-generated skeletal model and at least one virtual object.

3. The computer-mediated physical damping feedback system of claim 2, wherein the motion damping device includes at least one stiffness control device that adjusts a stiffness of the motion damping device based at least in part on the electrical voltage so as to vary the moveable flexibility of the participant.

4. The computer-mediated physical damping feedback system of claim 3, wherein the at least one stiffness control device comprises an electro-responsive gel unit that contains an electro-responsive gel having a viscosity that varies based at least in part on the voltage level of the electrical voltage.

5. The computer-mediated physical damping feedback system of claim 4, wherein at least one of the viscosity and a flowed amount of the electro-responsive gel decreases as the voltage level increases.

6. The computer-mediated physical damping feedback system of claim 2, wherein the skeletal model reproduces a movement of the participant, and has at least one virtual interaction point located at a point that matches a real-world location of the at least one stiffness control device, the at least one virtual interaction point configured to indicate an interaction between the skeletal model and the at least one virtual object.

7. The computer-mediated physical damping feedback system of claim 6, wherein the CMEE controller identifies the at least one virtual object in response to detecting an interaction between the at least one interaction point of the skeletal model and the at least one virtual object.

8. The computer-mediated physical damping feedback system of claim 7, wherein the CMEE controller determines an equivalent real-world object corresponding to the interacted virtual object.

9. The computer-mediated physical damping feedback system of claim 8, wherein the CMEE controller determines a resistance level corresponding to the interaction between the at least one interaction point of the skeletal model and the at least one virtual object, and wherein the resistance level is utilized to determine a corresponding voltage level that, when delivered to a stiffness control device, varies the stiffness applied to the user.

10. The computer-mediated physical damping feedback system of claim 9, wherein the CMEE controller determines the voltage level that, when applied to the at least one electro-responsive gel unit, varies at least one of a viscosity of the gel and an amount of gel flowing through the electro-responsive gel unit to simulate the expected resistance.

11. The computer-mediated physical damping feedback system of claim 10, wherein at least one first electro-responsive gel unit located at a first area of the motion damping device receives a first voltage having a first voltage level, and at least one second electro-responsive gel unit located at a different second area receives a second voltage having a different second voltage level,
   wherein the first voltage level induces a first stress at the first location and the second voltage level induces a second stress at the second location that is different from the first stress.

12. A computer-implemented method for controlling a computer-mediated physical damping feedback system, the computer-implemented method comprising:
   detecting movement of a motion damping device, the motion damping device configured to vary a moveable flexibility of a participant in response to an electrical voltage;

generating a computer-mediated environment including a computer-generated skeletal model and at least one virtual object;

determining a voltage level of the electrical voltage based at least in part on the interaction between the skeletal model and the at least one virtual object; and generating the electrical voltage at the voltage level that induces the stress applied by the motion damping device.

13. The computer-implemented method of claim 12 further comprising:

delivering the electrical voltage to at least one stiffness control device installed on the motion damping device; and adjusting a stiffness of the motion damping device based at least in part on the electrical voltage so as to vary the moveable flexibility of the participant.

14. The computer-implemented method of claim 13, further comprising controlling a viscosity of an electro-responsive gel unit contained in the stiffness controller device based at least in part on the voltage level of the electrical voltage so as to vary the stiffness of the motion damping device.

15. The computer-implemented method of claim 14, further comprising:

generating the skeletal model with at least one interaction point that is located at a position on the skeletal model that matches a location of a corresponding stiffness controlling device installed on the motion damping device; and detecting an interaction between the skeletal model and the at least one virtual object when the at least one interaction point interacts with the at least one virtual object.

16. The computer-implemented method of claim 15, further comprising:

locating at least one first electro-responsive gel unit at a first area of the motion damping device;

locating at least one second electro-responsive gel unit at a second area of the motion damping device different from the first area;

delivering a first voltage having a first voltage level to the at least one first electro-responsive gel unit to induce a first stress at the first location; and delivering a second voltage having a second voltage level to the at least one second electro-responsive gel unit to induce a second stress at the second location different from the first stress.

17. A computer program product to control a computer-mediated physical damping feedback system, the computer program product comprising a computer readable storage medium having program instructions embodied therewith, the program instructions executable by an electronic computer processor to control the electronic device to perform operations comprising:

detecting movement of a motion damping device worn by a participant, the motion damping device configured to vary a moveable flexibility of the participant in response to an electrical voltage;

generating a computer-mediated environment including a computer-generated skeletal model and at least one virtual object;

determining a voltage level of the electrical voltage based at least in part on the interaction between the skeletal model and the at least one virtual object; and generating the electrical voltage at the voltage level that induces the stress applied by the motion damping device.

18. The computer program product of claim 17, wherein the operations further comprise:

delivering the electrical voltage to at least one stiffness control device installed on the motion damping device; and adjusting a stiffness of the motion damping device based at least in part on the electrical voltage so as to vary the moveable flexibility of the participant.

19. The computer program product of claim 18, wherein the operations further comprise controlling a viscosity of an electro-responsive gel unit contained in the stiffness controller device based at least in part on the voltage level of the electrical voltage so as to vary the stiffness of the motion damping device.

20. The computer program product of claim 19, wherein the operations further comprise:

generating the skeletal model with at least one interaction point that is located at a position on the skeletal model that matches a location of a corresponding stiffness controlling device installed on the motion damping device; and detecting an interaction between the skeletal model and the at least one virtual object when the at least one interaction point interacts with the at least one virtual object.

* * * * *